(12) United States Patent
Streng

(10) Patent No.: US 9,410,015 B2
(45) Date of Patent: Aug. 9, 2016

(54) METHOD AND PLANT FOR PRODUCING POLYCARBONATE

(71) Applicant: EPC ENGINEERING CONSULTING GMBH, Rudolstadt (DE)

(72) Inventor: Michael Streng, Maintal (DE)

(73) Assignee: EPC ENGINEERING CONSULTING GMBH, Rudolstadt (DE)

( * ) Notice: Subject to any disclaimer, the term of this patent is extended or adjusted under 35 U.S.C. 154(b) by 0 days.

(21) Appl. No.: 14/409,592

(22) PCT Filed: Jun. 13, 2013

(86) PCT No.: PCT/EP2013/062240
§ 371 (c)(1),
(2) Date: Dec. 19, 2014

(87) PCT Pub. No.: WO2013/189823
PCT Pub. Date: Dec. 27, 2013

(65) Prior Publication Data
US 2015/0259473 A1   Sep. 17, 2015

(30) Foreign Application Priority Data
Jun. 19, 2012   (DE) .......................... 10 2012 105 296

(51) Int. Cl.
*C08G 64/00* (2006.01)
*C08G 64/30* (2006.01)
*B01J 19/18* (2006.01)
*C08G 64/20* (2006.01)
*B01J 19/24* (2006.01)
*C08G 63/02* (2006.01)

(52) U.S. Cl.
CPC ............... *C08G 64/307* (2013.01); *B01J 19/18* (2013.01); *B01J 19/245* (2013.01); *C08G 64/205* (2013.01); *B01J 2219/00083* (2013.01); *B01J 2219/00094* (2013.01); *B01J 2219/24* (2013.01)

(58) Field of Classification Search
CPC .............................. C08G 64/307; C08G 64/06
USPC .................. 528/171, 174, 196, 200, 202, 371
See application file for complete search history.

(56) References Cited

U.S. PATENT DOCUMENTS

| | | | |
|---|---|---|---|
| 5,322,919 A * | 6/1994 | Kurosawa et al. ............ 528/198 |
| 2006/0094856 A1 | 5/2006 | Hidalgo et al. | |
| 2008/0210343 A1 | 9/2008 | Ebert et al. | |

FOREIGN PATENT DOCUMENTS

| | | |
|---|---|---|
| DE | 10 2005 017 427 A1 | 10/2006 |
| DE | 10 2006 051 308 A1 | 5/2008 |
| EP | 1 018 529 A1 | 12/2000 |
| EP | 1 657 272 A1 | 5/2006 |

OTHER PUBLICATIONS

International Search Report issued in PCT/EP2013/062240 (Aug. 5, 2013).

* cited by examiner

*Primary Examiner* — Terressa Boykin
(74) *Attorney, Agent, or Firm* — Hamre, Schumann, Mueller & Larson, P.C.

(57) ABSTRACT

The invention relates to a method for producing a polycarbonate comprising at least the following steps: a) transesterification of one or more bisphenols with one or more diaryl carbonates in at least one transesterification reactor under continuous removal of the hydroxy aryl reaction product released, b) pre-polycondensation of the reaction product of the transesterification in at least one pre-polycondensation reactor under continuous removal of the hydroxy aryl reaction product released, c) polycondensation of the reaction product of the pre-polycondensation in at least one polycondensation reactor, wherein the aryl reaction product is removed during the transesterification reaction and the hydroxy aryl reaction product is removed during the pre-polycondensation reaction through a common column, wherein entrained diaryl carbonate is separated from the hydroxy aryl reaction product drawn off.

20 Claims, 6 Drawing Sheets

METHOD AND PLANT FOR PRODUCING POLYCARBONATE

FIELD OF THE INVENTION

The present invention relates to a method and an apparatus for the production of polycarbonates from bisphenol and diaryl carbonates in a multi-step reaction.

BACKGROUND

Polycarbonates are polymeric esters of carbonic acid with diols. Because of their interesting physical properties, such as low weight, good temperature and impact resistance, and excellent optical properties, in particular, polycarbonates are used for many products in the high-tech field. As a result, there is a continuously growing demand for high-quality polycarbonate.

Polycarbonate can be produced by polycondensation of phosgene with diols, or—a process which avoids the highly toxic phosgene species—by a transesterification reaction of carbonic acid diesters with bisphenols. The production of polycarbonates by transesterification reaction of carbonic acid diesters with bisphenols is generally carried out following a melt transesterification process.

The production of polycarbonates according to the melt transesterification process above is known, and described by way of example in "Schnell," Chemistry and Physics of Polycarbonates, Polymer Reviews, Vol. 9, Interscience Publishers, New York, London, Sydney 1964, in D.C. Prevorsek, B. T. Debona and Y. Kersten, Corporate Research Center, Allied Chemical Corporation, Morristown, N.J. 07960, "Synthesis of Poly(ester)carbonate Copolymers" in Journal of Polymer Science, Polymer Chemistry Edition, Vol. 19, 75-90 (1980), in D. Freitag, U. Grigo, P. R. Müller, N. Nouvertne, BAYER AG, "Polycarbonates" in Encyclopedia of Polymer Science and Engineering, Vol. 11, Second Edition, 1988, pages 648-718, and finally in Dres. U. Grigo, K. Kircher and P. R. Müller "Polycarbonate" in Becker/Braun, Kunststoff Handbuch, Vol. 3/1, Polycarbonate, Polyacetale, Polyester, Celluloseester, Carl Hanser Verlag, Munich, Vienna 1992, pages 117-299.

The reaction which proceeds from bisphenol and diaryl carbonates to the production of polycarbonates is represented by the following equation:

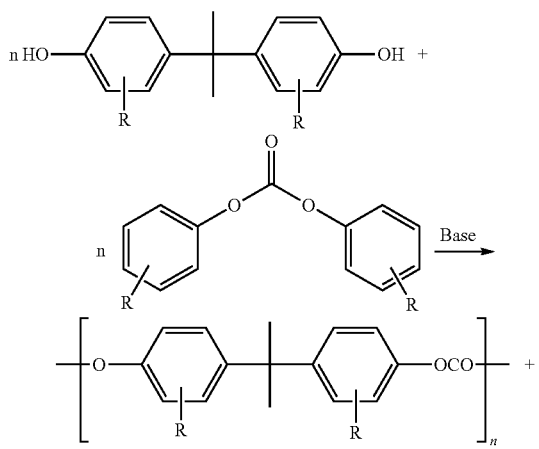

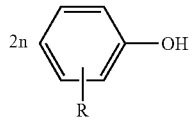

As can be seen from the above equation, a hydroxyaryl reaction product—such as phenol, for example—is released by the reaction. In the removal thereof by means of distillation, the phenol is obtained in the known method in a highly impure form, and cannot be used further without prior purification. As such, there is no possibility of using the phenol to produce new diaryl carbonate to be used again in the process, without intermediate purification steps inserted.

In the apparatuses described in the prior art used for the production of polycarbonates by melt transesterification processes, a substantial problem is that manual interventions are necessary, such as, by way of example, the cleaning of condensation units or heat exchangers, for example due to oligomeric reaction products made of the bisphenol and diaryl carbonates. This need for manual interventions leads to lengthy operation pauses with corresponding economic disadvantages. At the same time, the need for manual interventions also creates a risk for the operations personnel in the plant. As such, in cases where diphenolcarbonate (DPC) is used as the diaryl carbonate component, which is common, phenol is released as a reaction product. Due to the high toxicity and aggressiveness of phenol, every manual intervention then constitutes a potential endangerment of the operations personnel.

An important quality feature of polycarbonates is the absence, to the greatest degree possible, of discolorations. This is particularly important where polycarbonates are used for window panes, automobile headlights, and optical devices. In the apparatuses known in the prior art for the production of polycarbonate, problems consistently arise with respect to slight discolorations of the polycarbonate product, particularly in the form of yellow discolorations.

SUMMARY OF THE INVENTION

Proceeding from this point, the problem addressed by the present invention is that of providing a method and an apparatus for the production of polycarbonates which avoid the disadvantages explained above.

The problem addressed by the invention is particularly that of providing a method and an apparatus for the production of polycarbonate which enable the production of high-quality polycarbonate, wherein the most-closed possible material cycles are used, wherein the economic efficiency is improved as a result of minimized operation pauses, and wherein the need for manual interventions in the process is reduced to a minimum.

The problem according to the invention is addressed by a method according to claim 1. Preferred embodiments are given in claims 2 through 9.

In the method according to the invention, the polycarbonate is produced in three reaction steps from the starting substances bisphenol and diaryl carbonates, particularly in a transesterification reaction, a pre-polycondensation, and a polycondensation reaction.

The bisphenol are preferably dihydroxy-diarylalkanes with the formula HO—Z—OH, wherein Z is a divalent organic moiety with 6 to 30 carbon atoms, which contains one or more aromatic groups. The diaryl carbonate is preferably a di-($C_6$ to $C_{14}$-aryl) carbonic acid ester.

In one preferred embodiment, the bisphenol used is bisphenol A, and the diaryl carbonate used is diphenyl carbonate. In this case, the cleaved hydroxyaryl reaction product is phenol.

The transesterification reaction is described for the example of the reaction of bisphenol A with diphenyl carbonate via the following formula:

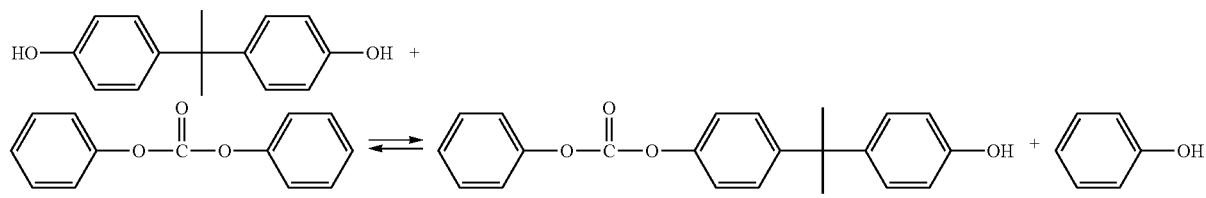

The transesterification reaction proceeds in one or more continuously stirred transesterification reactors, which are typically configured with internal heat coils and with an external jacket heater.

The transesterification reaction preferably proceeds according to the method according to the invention in three sequential transesterification reactors.

The transesterification reaction is influenced by a series of parameters. The most important parameters are:
- temperature
- pressure
- processing time
- mole ratio of bisphenol and diaryl carbonate
- the catalyst system used.

As can be seen from the reaction equation above, phenol is released during the transesterification reaction. Because of the temperature present and the vacuum conditions, the phenol enters the vapor phase and is continuously removed from the reaction mixture.

The polycondensation reaction which proceeds during the pre-polycondensation and the polycondensation method steps is represented by the following reaction diagram, using the example of the reaction of bisphenyl A and diphenyl carbonate:

In contrast to the transesterification reaction, the processing time does not play a significant role in the polycondensation. The most important parameter influencing the polycondensation reaction is the reactive surface area.

According to the method according to the invention, the polycondensation reaction preferably proceeds in a three-step process:
- pre-polycondensation step I (in a first pre-polycondensation reactor)
- pre-polycondensation step II (in a second pre-polycondensation reactor)
- final polycondensation step (in a polycondensation reactor (finisher)).

Two reactions specifically occur during the polycondensation reaction:

The polycondensation proceeds forming polymer chains, and polymer chains which have already been formed react with each other to form longer polymer chains. Parallel to this

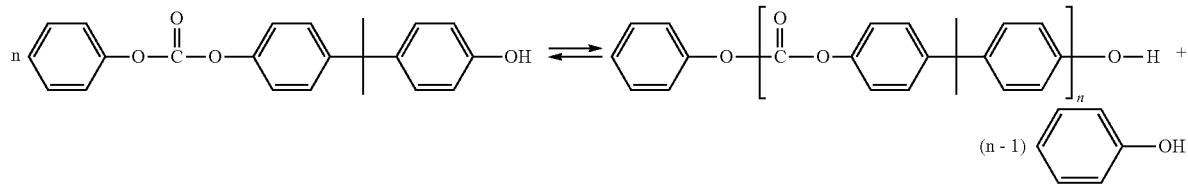

The polycondensation reaction is influenced by a series of parameters. The most important parameters are:
- reactive surface area
- temperature
- pressure
- the catalyst system used chain extension reaction, there are also chain breaking reactions which halt the growth of the chain lengths.

Using the example of a reaction of bisphenol A with diphenyl carbonate, chain breaks occur as per the following reaction diagram:

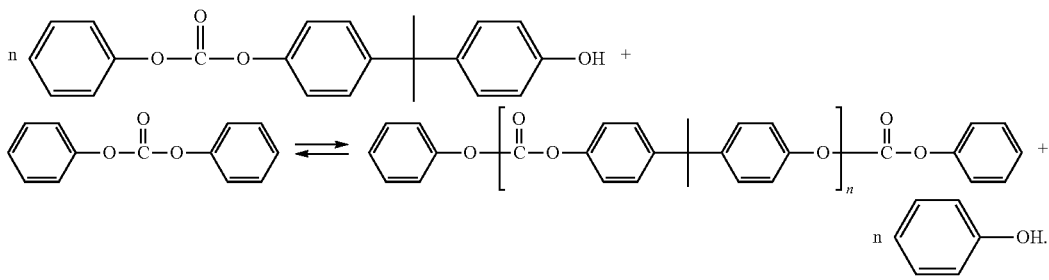

As a result of the chain extension reactions, further phenol is cleaved, which is removed from the reaction by the use of a vacuum.

In the methods known from the prior art, the phenol reaction product is separated as cleaved phenol in a distillation process, and is obtained at a purity level of approximately 60%. One of the impurity fractions in this case is the diphenyl carbonate, which transitions to the gas phase in significant amounts under the conditions at which the cleaved phenol is removed. The cleaved phenol with such a high impurity cannot therefore be further used without additional purification steps.

It has been surprisingly demonstrated that the phenol can be obtained at purities of ≥95% as a result of the use according to the invention of a column in the separation of the cleaved phenol during the transesterification reaction. In particular, the diphenyl carbonate carried along with the same is nearly completely separated from the phenol as a result of the column used, and therefore is obtained at such high purity that it can be fed back into the process.

A catalyst is advantageously used when the method according to the invention is carried out. The use of catalysts in the production of polycarbonates from bisphenol and diaryl carbonates using a melt transesterification process is known. It has been discovered in the present invention that good results are surprisingly achieved by the use of a new catalyst in the form of a mixture of at least one alkali metal salt of an aromatic alcohol and at least one boric acid ester of an aromatic alcohol. In the scope of a method according to the invention, a catalyst is particularly preferred which is in the form of a mixture of alkali metal phenolate and a boric acid ester of an aromatic alcohol.

Particularly good results are achieved when a mixture of 0.1 to 2 ppm alkali metal phenolate and 0.25 to 3 ppm boric acid ester of an aromatic alcohol is added as the catalyst.

One of the essential parameters which characterize the properties of a polycarbonate is the OH/aryl carbonate terminal group ratio. This ratio is defined as follows:

$$\text{OH/aryl carbonate terminal group ratio} = \frac{\text{Number of OH terminal groups}}{\text{Total number of the terminal groups}}$$

The determination of the OH/aryl carbonate terminal group ratio can be made, by way of example, by a separate determination of the OH terminal groups by means of photometric determination with $TiCl_4$, on the one hand, as well as by determination of the aryl carbonate terminal groups using HPLC with the monophenol formed following total saponification, on the other hand. In general, the OH terminal groups and the aryl carbonate terminal groups total 100% in the polycarbonate, together.

The adjustment of the desired OH/aryl carbonate terminal group ratio depends on many factors and is highly influenced by slight variations in the starting stoichiometry of the bisphenols and diaryl carbonates used—but most of all by the distillation losses of the diaryl carbonate during the distillation of the hydroxyl-aryl reaction product as well.

In the methods known from the prior art, the greatest possible separation of the hydroxyl-aryl reaction product (cleaved phenol) leads to high losses of the diaryl carbonate used. This leads to an unpredictable shift in the OH/aryl carbonate terminal group ratio.

This problem can be solved according to the invention by additional diaryl carbonate being added to the intermediate product streams between the transesterification reaction and the pre-polycondensation reaction for the purpose of adjusting the desired OH/aryl carbonate terminal group ratio.

Because the diaryl carbonate which is carried along during the separation of the hydroxyl-aryl reaction product (cleaved phenol) in the method according to the invention is obtained at high purity, the method according to the invention provides a particular advantage. This is the possibility of directly inserting the diaryl carbonate obtained in this manner, without intermediate steps, into the process by re-dosing the aryl carbonate to the intermediate product streams following the transesterification reaction.

As a result of this return of the diaryl carbonate, separated from the hydroxyl-aryl reaction product (cleaved phenol), it is particularly possible to reproduce the original stoichiometry between the diaryl carbonates and the bisphenols in order to achieve the desired OH/aryl carbonate terminal group ratio.

In practice, it is not absolutely necessary to perform a measurement of the OH/aryl carbonate terminal group ratio prior to the addition of diaryl carbonate between the transesterification reaction and the pre-polycondensation reaction for the purpose of adjusting the desired OH/aryl carbonate terminal group ratio. In one embodiment of the method, the operating parameters of the method—preferably in the method step of the transesterification—are adjusted for the purpose of achieving an average molecular weight in the final polymeric polycarbonate and an associated OH/aryl carbonate terminal group ratio the same determined by experiential values. In place of a concrete measurement of the OH/aryl carbonate terminal group ratio, it is therefore possible to draw a conclusion about the prevailing OH/aryl carbonate terminal group ratio following the transesterification reaction by using sufficiently precise control of the reaction conditions based on experiential values, and to accordingly control the addition of further aryl carbonate.

The desired average molecular weight of the oligomers and polymers can be continuously determined by online viscometry.

However, the addition of further diaryl carbonate to the intermediate product streams between the transesterification reaction and the pre-polycondensation reaction can also be used independently of the originally adjusted stoichiometry for the purpose of performing a fine adjustment of the OH/aryl carbonate terminal group ratio.

It is particularly advantageous that the addition of further diaryl carbonate to the intermediate product streams, between the transesterification reaction and the pre-polycondensation reaction, can be used in an embodiment of the method wherein the gaseous intermediate product streams are separated following the transesterification reaction. This makes it possible to produce polycarbonates with different OH/aryl carbonate terminal group ratios at the same time, as a result of the addition of further diaryl carbonate to at least one of the separated intermediate product streams. With a suitable adjustment of the stoichiometry between the diaryl carbonate and the bisphenols in the starting reaction mixture, and a corresponding addition of further diaryl carbonate between the transesterification reaction and the pre-polycondensation reaction into the separated intermediate product streams, it is therefore possible to vary the OH/aryl carbonate terminal group ratio over a very broad range.

In the case of two or more parallel polycondensation lines downstream of a common transesterification reactor, it is possible in one embodiment, for at least one of the parallel polycondensation lines, if an altered average molecular weight is desired in the end product for this line, to dose an amount of diaryl carbonate into the intermediate product stream, said amount defined by the experiential values mentioned above with respect to the average molecular weight of the intermediate product in a sub-stream, and to therefore adjust the necessary OH/aryl carbonate terminal group ratio in the end product.

The present invention also relates to an apparatus for the production of polycarbonate from at least one bisphenol and at least one diaryl carbonate. The apparatus according to the invention preferably serves the purpose of carrying out the method described in the previous section.

DESCRIPTION OF PREFERRED EMBODIMENT

Figure 1:
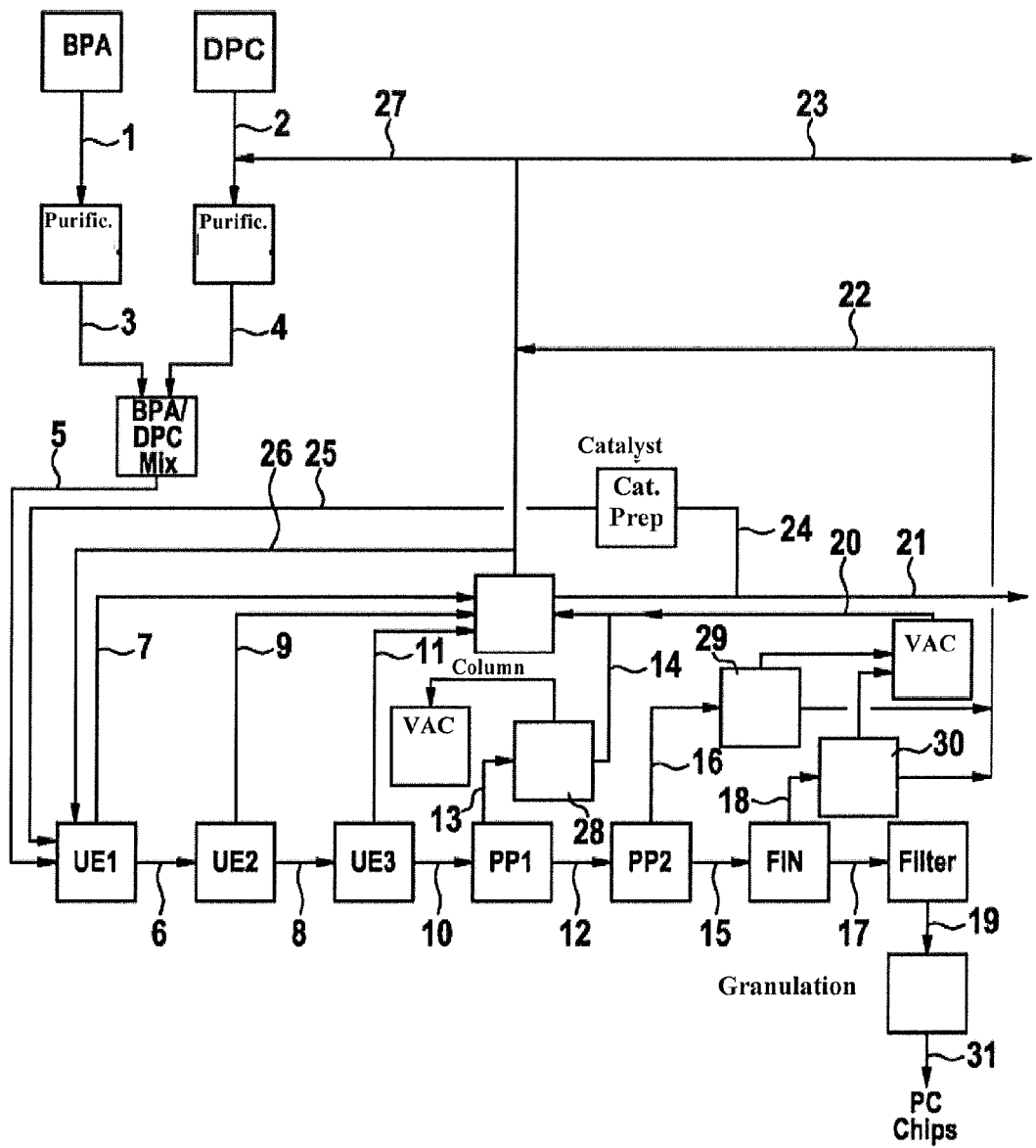
FIG. 1 is one embodiment of a schematic illustration of an apparatus for producing polycarbonate.

The apparatus according to the invention for the production of a polycarbonate has at least the following components:
  a) at least one transesterification reactor for the purpose of receiving a reaction mixture which includes at least one bisphenol and at least one diaryl carbonate, and for the purpose of producing a transesterified intermediate product,
  b) at least one pre-polycondensation reactor for the purpose of producing a pre-polycondensation intermediate product from the transesterified intermediate product,
  c) at least one polycondensation reactor (finisher) for the purpose of producing a polycarbonate from the pre-polycondensation intermediate product,
wherein the at least one transesterification reactor has means for the removal of the hydroxyl-aryl reaction product cleaved during the transesterification reaction, said means having at least one column.

Preferred embodiments of the apparatus according to the invention are given in claims 11 to 19.

The apparatus according to the invention typically serves the purpose of producing polycarbonates from bisphenol A and diphenyl carbonate as the raw materials.

In one preferred embodiment, the apparatus according to the invention has three transesterification reactors (transesterification reactors I to III), two pre-polycondensation reactors (pre-polycondensation reactors I and II), and one polycondensation reactor (the finisher).

The method sequence for the production of a polycarbonate from the starting compounds bisphenol A (BPA) and diphenyl carbonate (DPC) in such an apparatus is described in the following:

The reaction of the starting materials BPA and DPC proceeds at reduced pressure and elevated temperature in the transesterification reactors I to III, and leads to a transesterified monomer at a high rate of conversion (typically above 99.2%).

The transesterification reactors I to III are vertically stirred reactors with internal heating coils and additional external jacket heaters on the outside.

The reaction proceeds in transesterification reactor I at reduced pressure (approximately 250 to 500, and particularly approximately 300 to 400 mbar) and at a temperature of approximately 180 to 210° C.

The reaction proceeds in transesterification reactor II at further reduced pressure (approximately 150 to 300, and particularly approximately 200 mbar) and at a temperature of approximately 200 to 220° C.

The reaction proceeds in transesterification reactor III at an even further reduced pressure (approximately 50 to 150 mbar, and particularly approximately 100 mbar) and at a temperature of approximately 210 to 230° C.

The flow of material between the transesterification reactors I to III is maintained, on the one hand, gravimetrically due to the cascading of the reactors, and on the other hand due to the pressure difference between the transesterification reactors I to III.

The phenol cleaved during the reaction is fed to the column together with the DPC carried along with the same, so that phenol and DPC are each recovered at purities of greater than 95%.

The conversion of the transesterified monomers from the transesterification step into polymer chains of a certain chain length (average chain length of approximately n=20) occurs in the pre-polycondensation reactor I.

The reaction runs under a vacuum of approximately 10 to 20 mbar, and particularly approximately 15 mbar, and at a temperature of approximately 235 to 255° C.

Phenol and DPC released during the pre-polycondensation reaction, as well as oligomer carried along with the same, are preferably separated in a double condenser.

From pre-polycondensation reactor I, the reaction mass moves into pre-polycondensation reactor II, where a chain extension occurs leading to a chain length of n=approximately 70 to 80. The pre-polycondensation reaction in the pre-polycondensation reactor II proceeds at a vacuum of approximately 2.5 to 7.5 mbar, and particularly approximately 5 mbar, and at a temperature of approximately 270 to 290° C.

The final polycondensation takes place in the polycondensation reactor (finisher) leading to a chain length of typically n=approximately 120 to 200, and particularly approximately 160 (and/or a molecular weight $M_W$=approximately 31,000 kg/kmol).

The reaction in the polycondensation reactor proceeds under a vacuum of approximately 0.25 to 1.25 mbar, and particularly approximately 0.5 to 0.8 mbar, and at a temperature of approximately 290 to 320° C.

In one preferred embodiment, the apparatus according to the invention has separate melt vessels for bisphenol A and diaryl carbonate in which the raw materials are melted and then filtered to remove solid impurities. For the purpose of increasing the purity of the monomers used, the apparatus according to the invention preferably has means for the recrystallization of the monomeric components bisphenol and diaryl carbonate.

The raw materials present in the liquid phase are pre-heated by heat transfer media and pumped into the transesterification reactor in the desired mole ratio, where they preferably are mixed with a suitable catalyst system and heated to the transesterification temperature. During the transesterification reaction, the hydroxyl-aryl reaction product (cleaved phenol) is released. The short polymer chains (oligomers) formed during the transesterification reaction exit the transesterification reactor and the next reaction step occurs in the pre-polycondensation reactor I. Using high temperatures and a very reduced pressure, polymer chains of moderate chain length are formed. Following the pre-polycondensation step I, the intermediate product formed thereby is transferred first into the pre-polycondensation reactor II and then into the polycondensation reactor (finisher). The pre-polycondensation reactor II and the polycondensation reactor (finisher) are designed as horizontal, spinning disk reactors to achieve the required high surface area.

The apparatus comprises all necessary means, such as particularly means for circulation of the heating medium, means for generating a vacuum, means for generating pellets or chips from the polycarbonate product, and means for packaging the end product.

FIG. 1 shows a schematic illustration of one embodiment of an apparatus according to the invention, in the form of a block diagram:

(1) BPA—raw material melt
(2) DPC—raw material melt
(3) BPA—purified
(4) DPC—purified
(5) raw material melt mixture
(6) UE 1—product melt
(7) UE 1—phenol/DPC vapors
(8) UE 2—product melt
(9) UE 2—phenol/DPC vapors
(10) UE 3—product melt
(11) UE 3—phenol/DPC vapors
(12) PP1—pre-polycondensation product
(13) PP1—phenol/DPC vapors
(14) PP1—condensate (cleaved phenol/DPC)
(15) PP2—pre-polycondensation product
(16) PP2—phenol/DPC vapors
(17) finisher—pre-polycondensation product
(18) finisher—phenol/DPC vapors
(19) finisher—polycarbonate melt
(20) cleaved phenol recirculation
(21) phenol distillate discharge
(22) cleaved DPC recirculation
(23) cleaved DPC discharge
(24) cleaved phenol recirculation for catalyst
(25) phenol catalyst
(26) cleaved DPC recirculation
(27) cleaved DPC for pre-purification
(28) PP1—double condenser
(29) PP2—double condenser
(30) finisher—double condenser
(31) end product PC granulate The BPA melt (1) and DPC melt (2) are fed to a raw material purification. The purification of DPC is performed by distillation, and the purification of BPA is carried out according to the prior art.

The purified BPA melt (3) and DPC melt (4) are continuously or discontinuously mixed in a preferred molar ratio of 1.0-1.2 mol DPC/1 mol BPA, which achieves a stabilization of the BPA against degradation in a temperature range of 130-180° C.

The BPA-DPC starting material melt (5) is continuously fed to the first transesterification step UE 1, The volume of catalyst needed for the reaction is likewise added in dissolved form in a carrier fluid and/or a solvent, preferably phenol, to the polycondensation process (25).

The transesterification reaction preferably takes pace in three sections UE1-UE2-UE3. The resulting transesterification product melt contains more and more transesterified monomer units (6)-(8)-(10) in proportion to the progress of the reaction.

The amount of phenol released in this process as a reaction product of the UE steps is fed to the integrated vacuum column as a vapor stream (7)-(9)-(11).

The polycondensation reaction preferably takes place in two sections PP1-PP2. The residual transesterification in progress, and primarily the resulting degree of polycondensation, include more and more long-chain polymer units (12)-(15) in proportion to the progress of the reaction. The final reaction of the polycondensation preferably takes place in the FIN section. The resulting final degree of polycondensation contains the desired polymer chain lengths (17) according to the adjustable reaction progress.

The amounts of phenol and DPC released in the process as reaction products of the pre- and final polycondensation steps are fed to the double condensation system (28)-(29)-(30) as vapor streams (13)-(16)-(18).

The mixed condensate produced as a resulting cleaved product of the reaction, preferably consisting of phenol and majority fractions of DPC is continuously discharged as cleaved DPC, and can partially be fed back to the transesterification section (22), (26) and/or returned to the raw material processing (27) or can leave the apparatus (23).

The non-condensable fractions of the polycondensation vapors, particularly cleaved phenol, are condensed in the vacuum generation unit by compression and targeted temperature control, and are fed back to the column (14)-(20).

The resulting cleaved phenol, purified by distillation under vacuum in the column, exits the apparatus (21) and can be returned to the raw material production, by way of example.

A sub-stream of the purified cleaved phenol (24) is internally recycled for the preparation of the catalyst mixture.

The polymer melt is continuously filtered (19) and fed to the granulation unit.

The granulation unit, preferably a strand pelletizer, produces the final PC granulate (31).

Figure 2:
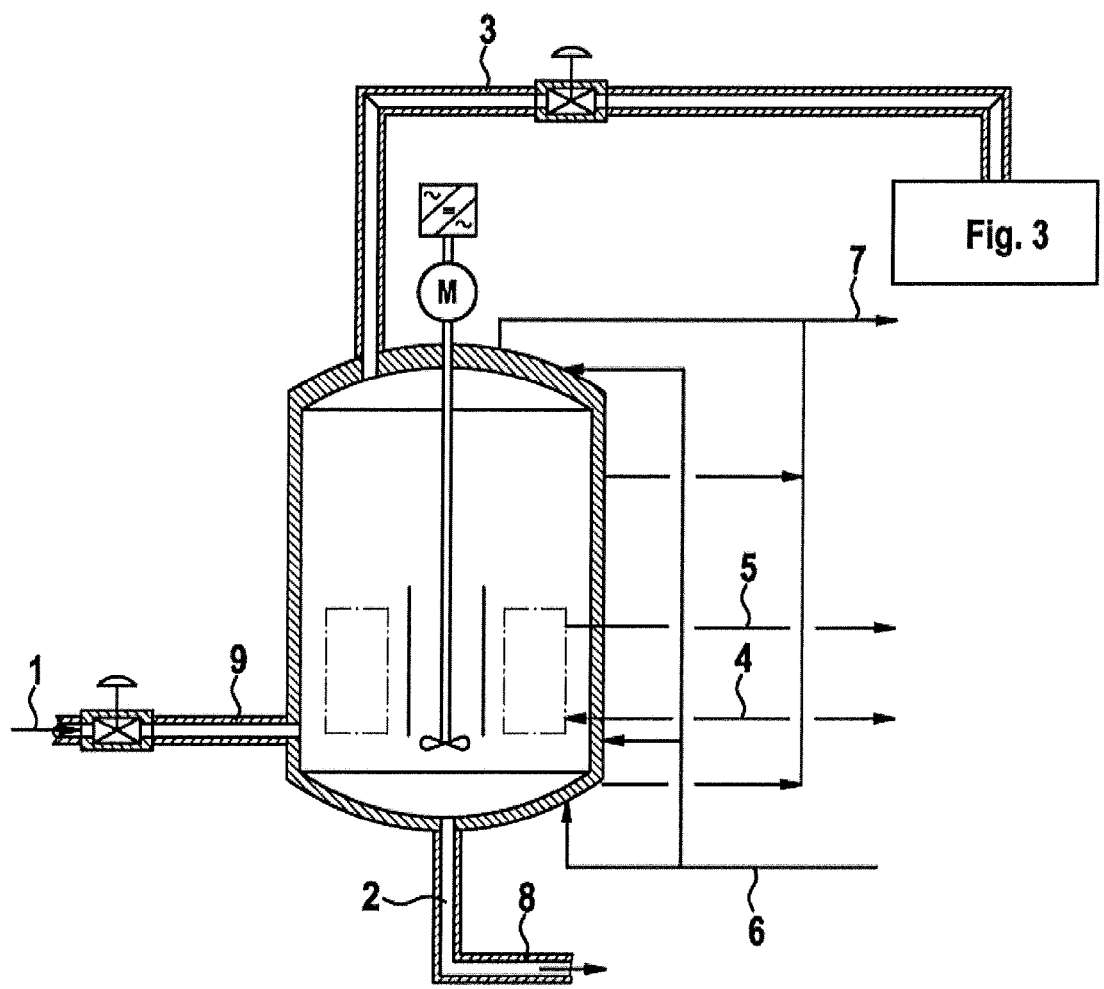
FIG. 2 is a schematic illustration of a transesterification reactor.

FIG. 2 shows a schematic illustration of a transesterification reactor of the apparatus according to the invention:

(1) precursor or raw material mixture input
(2) transesterification product output
(3) reaction vapors
(4) HTM heating medium input, heating coil
(5) HTM heating medium output, heating coil
(6) HTM reactor jacket heater feed line
(7) HTM reactor jacket heater return line
(8) HTM product line jacket heater
(9) HTM product line jacket heater The precursor or raw material mixture (9) continuously enters the reactor under controlled conditions. The transesterification product continuously exits from (2) as a melt, and the reaction vapors exit the reactor vessel (3) in the direction of the column (FIG. 3), if necessary via a vapor regulating valve, which simultaneously regulates the reaction pressure.

The stirred reaction vessel is heated by a heat transfer medium (HTM). The required thermal process heat is supplied (4) via a defined HTM throughput volume of an internal heating coil, and returns (5) after releasing heat. The reactor vessel is heated by a supply of HTM in and through the reactor jacket, and is thereby actively insulated (6)-(7). The HTM heating can preferably be divided into multiple segments.

Figure 3:
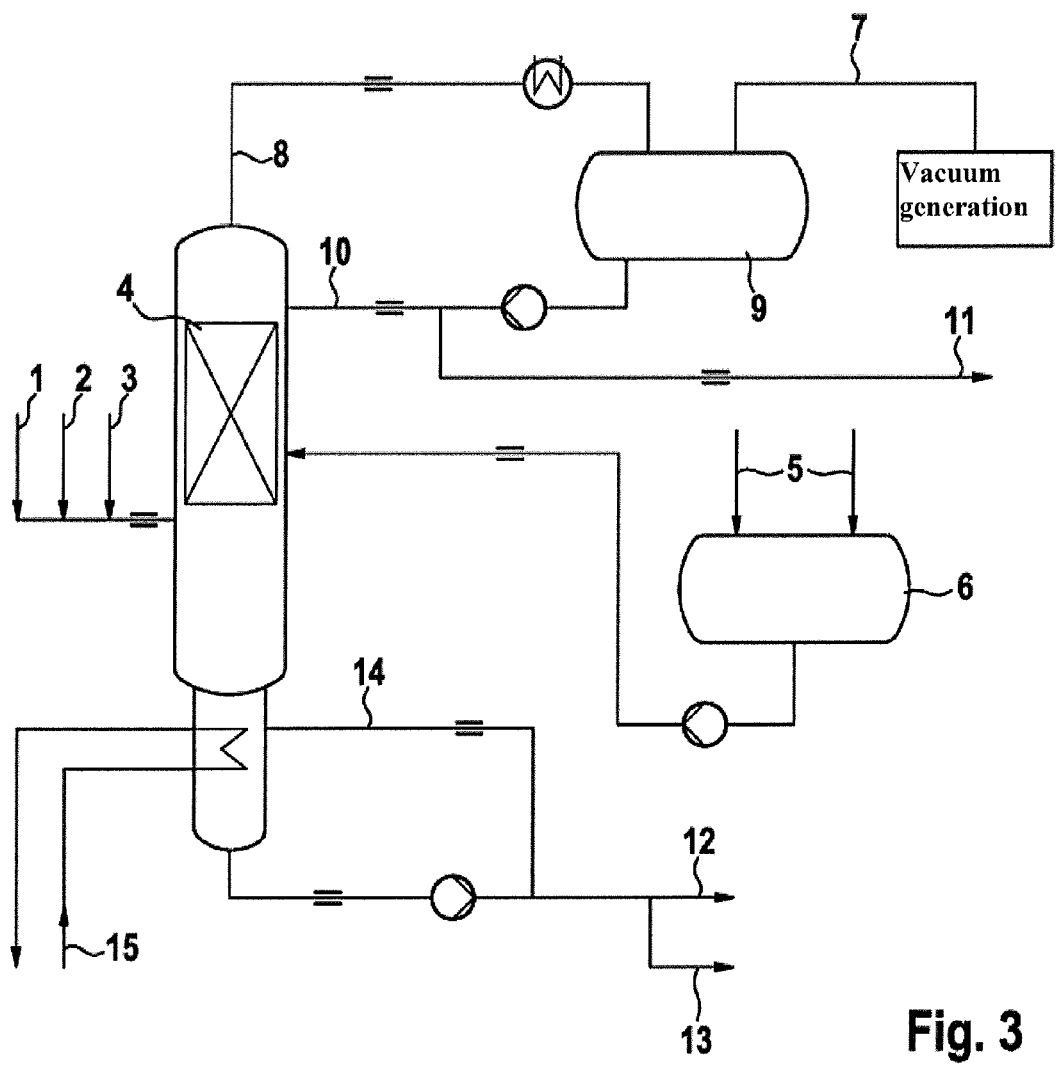
FIG. 3 is a schematic illustration of a column for separating phenol and DPC.

FIG. 3 shows a schematic illustration of a column for the purpose of separating phenol and DPC in the apparatus according to the invention:

(1) vapor input UE1
(2) vapor input UE 2

(3) vapor input UE 3
(4) transesterification column with packing
(5) cleaved phenol from PP1 and PP2/finisher vacuum system
(6) cleaved phenol collection vessel
(7) vacuum vent
(8) phenol vapor output
(9) phenol distillate reflux vessel
(10) reflux
(11) phenol distillate product
(12) cleaved DPC recirculation to UE1
(13) cleaved DPC discharge
(14) cleaved DPC internal circulation/exchange
(15) heat transfer medium HTM feed The transesterification vapor streams (1)-(2)-(3) continuously enter the process column. The transesterification column (4) is operated with a vacuum, and a fractionating packing material is preferably used to enable effective distillation. Cleaved phenol as the condensate of PP1, and condensate of the vacuum system of PP1-PP2 and finisher (5) is fed to a cleaved phenol collection vessel (6) and recycled into the process column for purification. The phenol and DPC fractions of the UE vapor streams (1)-(2)-(3), and the cleaved phenol (5), and separated with high efficacy:

Phenol as the overhead product (8) is condensed and returned (10) from the reflux vessel (9) in part to the column as a defined reflux of highly purified phenol distillate, and is separated as a distillate (11) for re-use.

DPC as the bottoms product is preferably directly returned (12) to the transesterification step 1 (UE1), which increases the efficiency of the raw material consumption, or is discharged (13) from the apparatus for re-use.

A defined DPC stream is recycled (14) for the purpose of exchange of the column bottoms. HTM is supplied (15) in a controlled manner as the heat carrier for the purpose of applying the needed thermal distillation energy.

The applied, integrated separation method therefore achieves high purity of the cleaved DPC melt and the cleaved phenol, which enables the direct recycling of these cleaved products.

Figure 4:
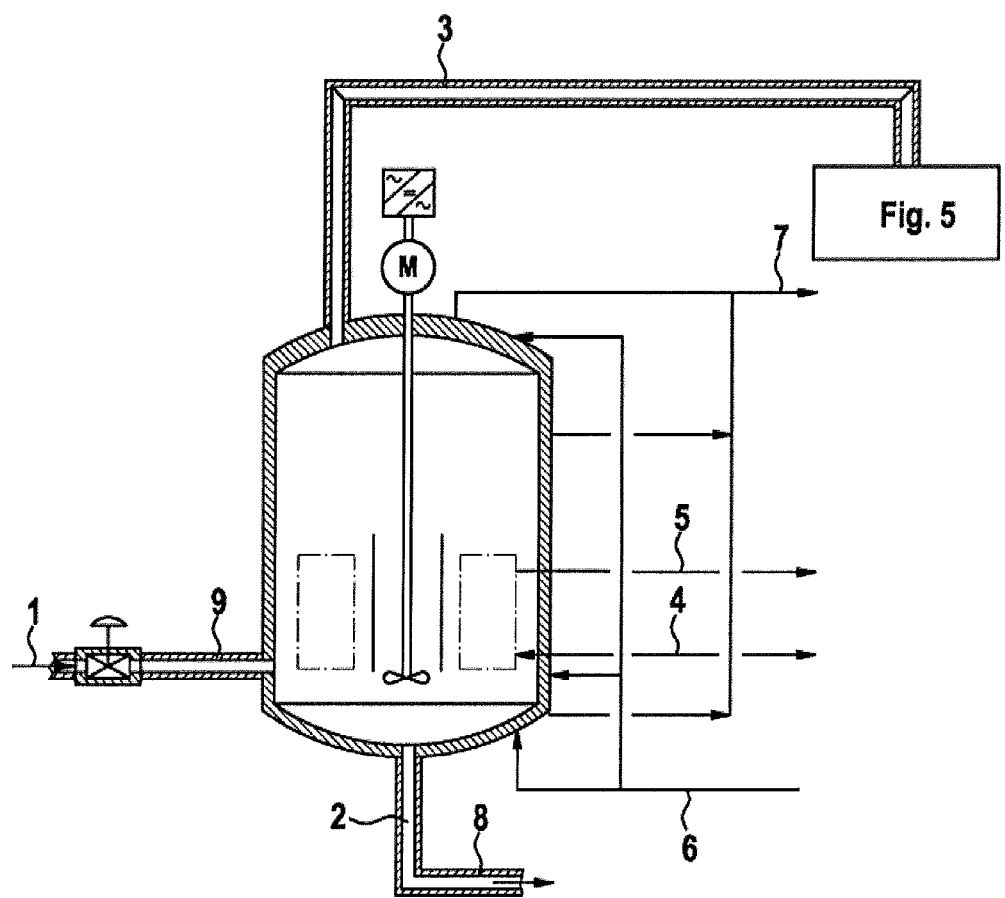
FIG. 4 is a schematic illustration of a pre-condensation reactor I.

FIG. 4 shows a schematic illustration of a pre-polycondensation reactor I of an apparatus according to the invention:
(1) precursor or raw material input
(2) transesterification product output
(3) reaction vapors
(4) HTM heating medium input, heating coil
(5) HTM heating medium output, heating coil
(6) HTM reactor jacket heater feed line
(7) HTM reactor jacket heater return line
(8) HTM product line jacket heater
(9) HTM product line jacket heater The precursor (9) continuously enters the reactor under controlled conditions. The pre-polycondensation product continuously exits from (2) as a melt, and the reaction vapors exit the reactor vessel (3) in the direction of the double condenser (FIG. 5).

The stirred reaction vessel is heated by a heat transfer medium (HTM). The required thermal process heat is supplied (4) via a defined HTM throughput volume of an internal heating coil, and returns (5) after releasing heat. The reactor vessel is heated by a supply of HTM in and through the reactor jacket, and is thereby actively insulated (6)-(7). The HTM heating can preferably be divided into multiple segments.

Figure 5:
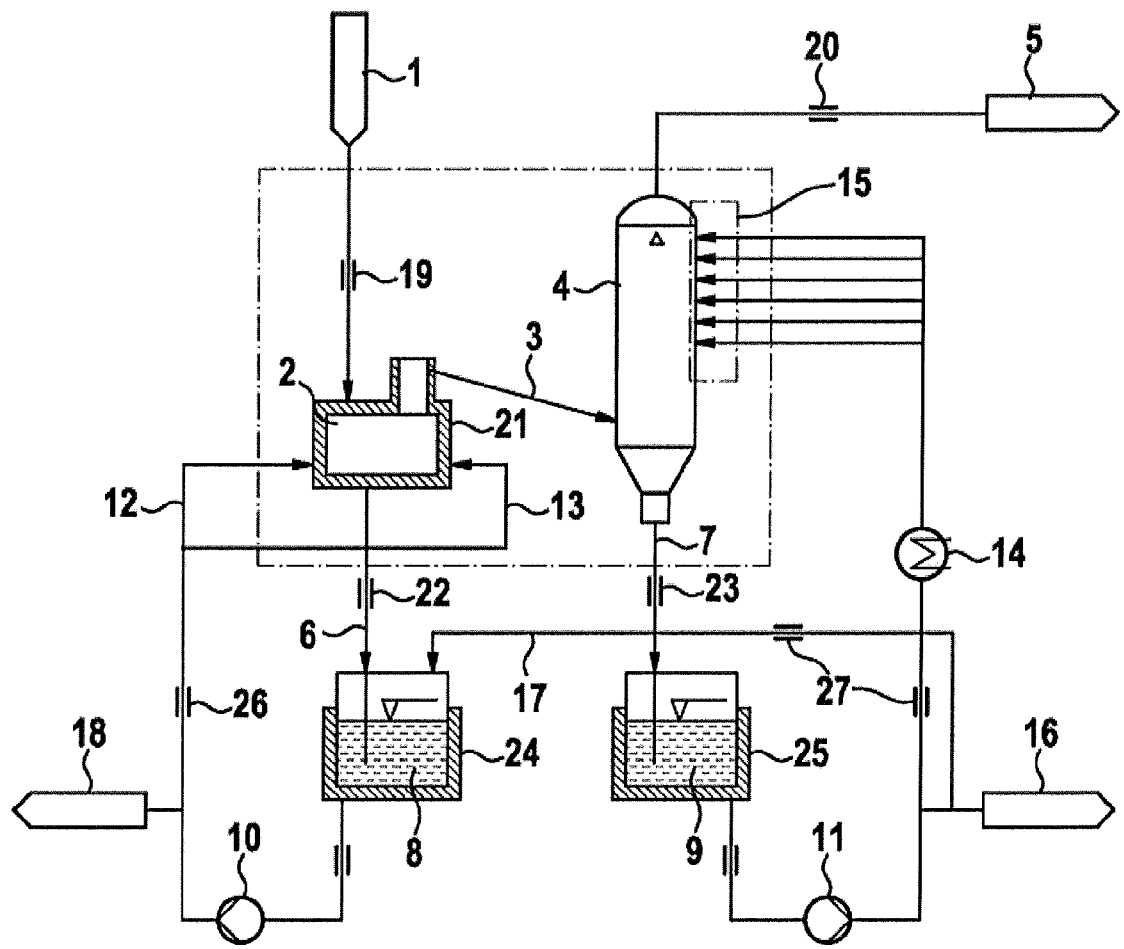
FIG. 5 is a preferred embodiment of a schematic illustration of an apparatus for producting polycarbonate.

FIG. 5 shows a schematic illustration of a double condenser (for pre-polycondensation 1, 2 and polycondensation reactor (finisher)) in the apparatus according to the invention:

(1) vapor input
(2) EPC double condenser (section 1)
(3) product line
(4) EPC double condenser (section 2)
(5) vapor output
(6) product line
(7) product line
(8) immersion vessel
(9) immersion vessel
(10) liquid circulation pump
(11) liquid circulation pump
(12) product line
(13) product line
(14) liquid cooler
(15) spray condensate input
(16) return feed
(17) product line
(18) discharge
(19) heating for the product line
(20) heating for the product line
(21) heating for section 1
(22) heating for the product line
(23) heating for the product line
(24) heating for the immersion vessel
(25) heating for the immersion vessel
(26) heating for the product line
(27) heating for the product line The double condenser primarily consists of two sections (2)-(4).

Section 1 (2) preferably serves the purpose of separating oligomers from the vapors, while section 2 (4) preferably serves the purpose of condensing the vapors.

The reaction vapors of the pre-polycondensation and the polycondensation (1), which contain the separated oligomers from the reaction step, enter the first section of the double condenser (2), the same operated under a vacuum. The entering vapor line is thermally jacket heated (19) by means of HTM.

In this first section, the fraction of oligomers is preferably removed from the entering vapor (19): oligomeric and polymeric melt fractions flow to the condenser and are mechanically separated from the vapor by an internal scraper stirrer device.

The main volume of the vapor stream (19) is fed to the second section of the double condenser (4) uncondensed via a product line (3). The remaining non-condensable vapor fraction, particularly cleaved phenol, leaked air, and inert gas fractions are fed (5) to the vacuum generation unit via an HTM-heated jacket line (20).

The exiting condensates are fed via jacket-heated product lines (6) (22)-(7), (23) to the immersion vessels (8)-(9). The condenser sections 1 and 2 are preferably set more than 10 m above the fluid level inside the immersion vessel, thereby fulfilling the function of a "barometric immersion."

The condensate, containing oligomers, from the first section (6), with the fraction of the recirculated main volume of the condensate of the second section (17), containing no oligomers, circulates via pump (10) and re-enters the first condenser section, preferably from two sides (12)-(13), which enables an efficient rinsing of the solidified oligomer fractions from the first section.

The condensate circulation from the second into the first section (17) also serves the purpose of a permanently necessary dilution of the circulation fluid in section 1.

The condensate of the second section (7) is a spray condenser [sic] and forms the main volume of the entire condensate. This circulates via a pump (11) and re-enters the second condenser section preferably via parallel spray fluid lines (15), enabling an efficient spray condensation by means of internal fluid distributers.

The condensation heat applied via the vapor condensation is absorbed via fluid heat exchangers (14).

The immersion vessel and fluid lines are jacket heated by a special liquid heat transfer medium HTM (22)-(26), (23)-(27). The remaining excess condensate volume is separated from the first and the second immersion vessels and the fluid circulation system in a controlled manner (16)-(18). The special feature of this double condenser system is high availability.

A fluid circulation in section 1, which is temporarily halted by the oligomer blockage, does not necessarily lead to an interruption of the entire condensation process. The actual vapor condensation is permanently maintained by section 2 of the double condenser.

Figure 6:
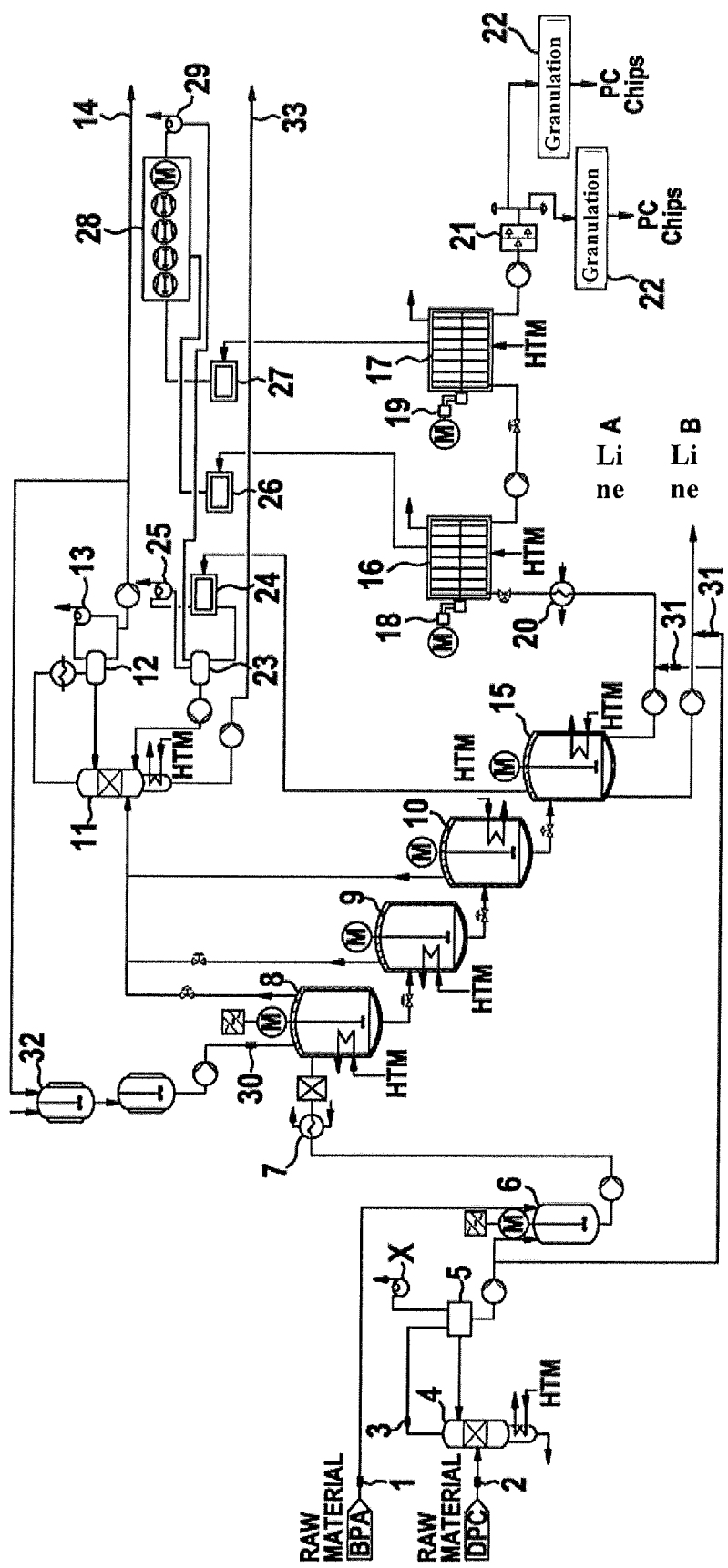

FIG. 6 shows one preferred embodiment of the apparatus according to the invention, as a whole:

(1) bisphenol A (BPA) melt feed (purified)
(2) diphenyl carbonate (DPC) melt feed (not purified)
(3) diphenyl carbonate (DPC) melt feed (purified according to the EPC distillation process)
(4) DPC vacuum column
(5) DPC reflux and product vessel
(6) DPC/BPA raw material melt vessel
(7) raw material melt heater
(8) transesterification reaction step UE1
(9) transesterification reaction step UE2
(10) transesterification reaction step UE3
(11) process vacuum column (DPC/phenol separation)
(12) phenol reflux and product vessel
(13) vacuum pump system, process column
(14) phenol distillate discharge
(15) pre-polycondensation reactor PP1
(16) pre-polycondensation reactor PP2 (based on the perforated spinning disk principle)
(17) FINISHER polycondensation reactor (based on the spinning disk principle)
(18) PP2 perforated spinning disk stirrer, hydraulic drive
(19) FINISHER spinning disk stirrer, hydraulic drive
(20) pre-polycondensation pre-heater
(21) polycondensation melt filtration
(22) polycarbonate PC granulate generation
(23) collection vessel for cleaved phenol from the polycondensation reaction steps, and vacuum system for the recirculation and harvesting of cleaved phenol and separation of the DPC fraction
(24) double condenser, PP1
(25) vacuum pump, PP1
(26) double condenser, PP2
(27) double condenser, FINISHER
(28) multi-stage vacuum system for PP2 and FINISHER
(29) pre-vacuum pump for the multi-stage vacuum system
(30) catalyst input (catalyst dissolved in phenol)
(31) DPC addition for the purpose of adjusting a defined terminal group ratio in the final polycarbonate
(32) cleaved phenol partial recirculation (recycling) for the catalyst input One important quality criterion for polycarbonate, particularly when it is used for window panes or optical devices, is the greatest possible absence of yellow discolorations. These yellow discolorations are the result of the occurrence of side reactions which lead to yellowed impurities.

It has been surprisingly shown in the present invention that it is possible to prevent the occurrence of such yellow discolorations in the polycarbonate product almost entirely when certain materials are selected for the parts of the transesterification reactor which come into contact with the reaction components.

In one preferred embodiment, the surface of the transesterification reactor which comes into contact with the reaction components is therefore preferably made of the following material:

alloy 59 (material number 2.4605)

In order to make possible an optimum adjustment of the desired OH/aryl carbonate terminal group ratio, the apparatus according to the invention preferably has means for the addition of diethyl carbonate to the transesterification intermediate product after the same has exited the transesterification reactor. In one particularly preferred embodiment, the device according to the invention has means for the division of the intermediate product stream after the same has left the transesterification reactor, wherein diaryl carbonate is separately added to the separated intermediate product stream. It is particularly preferred that the device according to the invention has means which allow for the use of the diaryl carbonate recovered via distillation over the column from the transesterification reaction for the purpose of adding further diaryl carbonate following the transesterification reaction. In this way, the diaryl carbonate recovered during the transesterification reaction can be optimally re-used.

In the apparatuses known from the prior art for the production of polycarbonate, there are always long machine down times because manual interventions in the process are necessary—particularly to purify components of the apparatus—making a temporary shutdown of the apparatus necessary. One particular problem in the apparatuses known in the prior art for the production of polycarbonate is found in the pre-polycondensation reactors and polycondensation reactor, wherein phenol cleaved by the polycondensation reaction is removed by vacuum and then condensed. In this case, deposition of oligomers occurs in the condensing device due to oligomers carried along together with the phenol, which makes it necessary to manually clean the condenser. For this a shutdown of the apparatus is generally necessary.

According to the invention, this problem is overcome in that at least one pre-polycondensation reaction reactor and/or at least one polycondensation reactor has means for the removal of the hydroxyl-aryl reaction product cleaved during the pre-polycondensation reaction, designed in such a manner that the separated hydroxyl-aryl reaction product as well as oligomer carried along with the same are separately condensed out of the pre-polycondensation reaction. These means are preferably a double condenser as shown in FIG. 2.

In one preferred embodiment, the polycondensation reactor is designed as a spinning disk reactor. It is particularly preferred in this case that the polycondensation reactor has a hydraulic device. This leads to the advantage, in contrast to the apparatus known in the prior art, that there is no need to shut down the apparatus at regular intervals for maintenance of the drive, which leads to apparatus pauses.

The apparatus according to the invention preferably differs from that known from the prior art in that the apparatus has means which enable the separation of the polycarbonate reaction product from the polycondensation reactor into two or more sub-streams, wherein the apparatus has two or more pelleting devices for the purpose of pelleting the two or more sub-streams of the polycarbonate reaction product.

A further disadvantage of the apparatus known from the prior art for the production of polycarbonates is that there are always deposits of, by way of example, oligomers inside the entire apparatus, which lead to blockages of the apparatus, which frequently make it necessary to shut down the apparatus and manually clean the blocked elements. According to the invention, this problem is solved in that a specially selected alkyl aromatic compound is used as an additional heat transfer medium for the temperature control of both the raw material melt and hydroxyl-aryl reaction products, which has good flow properties and heat transfer capacity in the temperature range of 50 to 120° C.

In one particularly preferred embodiment, a $C_{10}$-$C_{13}$-alkyl aromatic compound is used as the additional heat transfer medium. A particularly preferred heat transfer medium is Therminol ADX-10 (Soltia UK Ltd.), which has a boiling point of 293° C., or a comparable heat transfer medium. It is possible due to the use of this heat transfer medium to heat the apparatus, without elevated pressure, to the temperatures at which the named oligomers melt, such that it is possible to remove the blockages without a manual intervention. This leads to a reduction in apparatus down time and the prevention of a risk to plant personnel due to toxic and/or corrosive products—particularly phenol.

The present invention also relates to a polycarbonate which has been produced according to the method according to the invention, or by using the apparatus according to the invention. Moreover, the present invention also relates to the use of a polycarbonate produced in this manner for the production of window panes, bottles, components for automobile headlights, eyeglass lenses, lenses, disposable syringes, helmets and visors for helmets, sports goggles and sunglasses, passenger vehicle accessories, solar modules, housings for computers and data storage devices such as CDs and DVDs.

The invention claimed is:

1. A method for production of a polycarbonate, comprising at least the following steps:
    a) transesterification of one or more bisphenols with one or more diaryl carbonates in at least one transesterification reactor, with continuous removal of the hydroxyl-aryl reaction product which is released,
    b) pre-polycondensation of the reaction product of the transesterification in at least one pre-polycondensation reactor, with continuous removal of the hydroxyl-aryl reaction product,
    c) polycondensation of the reaction product of the pre-polycondensation in at least one polycondensation reactor,
    wherein the removal of the aryl reaction product during the transesterification reaction, and the removal of the hydroxyl-aryl reaction product during the pre-polycondensation reaction, is performed by a shared column, wherein diaryl carbonate carried along with the same is separated from the removed hydroxyl-aryl reaction product.

2. The method according to claim 1,
    wherein
    dihydroxy-diarylalkanes with the formula HO—Z—OH are used as the bisphenols, wherein Z is a divalent organic moiety with 6 to 30 carbon atoms, containing one or more aromatic groups.

3. The method according to claim 1,
    wherein di-($C_6$ to $C_{14}$-aryl)-carbonic acid esters are used as the diaryl carbonate.

4. The method according to claim 1,
    wherein bisphenol A is used as the bisphenol, and diphenyl carbonate is used as the diaryl carbonate.

5. The method according to claim 1,
    wherein a catalyst in the form of a mixture of at least one alkali metal salt of an aromatic alcohol, and at least one boric acid ester of an aromatic alcohol, is added to the transesterification reaction of step a).

6. The method according to claim 5,
    wherein a catalyst in the form of a mixture of an alkali metal phenolate and boric acid ester of an aromatic alcohol is added.

7. The method according to claim 6,
    wherein a mixture consisting of 0.1 to 2 ppm alkali metal phenolate and 0.25 to 3 ppm boric acid ester of an aromatic alcohol is added as a catalyst.

8. The method according to claim 1,
    wherein diaryl carbonate is added to the intermediate product stream between the transesterification reaction and the pre-polycondensation reaction for the purpose of adjusting the OH/aryl carbonate terminal group ratio.

9. An apparatus for the method according to claim 1,
    wherein the intermediate product stream is divided following the transesterification reaction, wherein diaryl carbonate is separately added to at least one of the divided intermediate product streams prior to the pre-polycondensation reaction to adjust the different OH/aryl carbonate terminal group ratios in the divided intermediate product streams.

10. An apparatus for the production of a polycarbonate, having:
    a) at least one transesterification reactor for the purpose of receiving a reaction mixture which includes at least one bisphenol and at least one diaryl carbonate, and for the purpose of producing a transesterified intermediate product,
    b) at least one pre-polycondensation reactor for the purpose of producing a pre-polycondensation intermediate product from the transesterified intermediate product,
    c) at least one polycondensation reactor (finisher) for the purpose of producing a polycarbonate from the pre-polycondensation intermediate product,
    wherein at least one transesterification reactor has means for the removal of the hydroxyl-aryl reaction product cleaved during the transesterification reaction, said means having at least one column.

11. The apparatus according to claim 10,
    wherein the surfaces of the transesterification reactor, which come into contact with the reaction components, consist of the following material: alloy 59 (material number 2.4605).

12. The apparatus according to claim 10,
    wherein the apparatus has two pre-polycondensation reaction stages connected in series, as well as means for dosing diaryl carbonate to the transesterified and pre-polycondensed intermediate product after the same have left the first pre-polycondensation reaction.

13. The apparatus according to claim 12,
    wherein the apparatus has means which enable a division of the transesterified and pre polycondensed intermediate product from the first pre-polycondensation reactor into two or more parallel sub-streams, as well as means which enable a separate dosing of diaryl carbonate to the two or more parallel sub-streams.

14. The apparatus according to claim 12,
    wherein the apparatus has means which enable the use of the diaryl carbonate recovered from the transesterification reactor and the at least one pre-polycondensation reactor, for the purpose of dosing diaryl carbonate to the transesterified intermediate product.

15. The apparatus according to claim 10,
    wherein at least one pre-polycondensation reaction reactor and/or at least one polycondensation reactor has/have means for the removal of the hydroxyl-aryl reaction product cleaved during the polycondensation reaction, designed in such a manner that the separated hydroxyl-aryl reaction product, as well as oligomers carried along with the same, are condensed out of the pre-polycondensation reaction separately.

16. The apparatus according to claim 10, wherein the polycondensation reactor is designed as a spinning disk reactor.

17. The apparatus according to claim 10, wherein the polycondensation reaction is driven hydraulically using a hydraulic fluid.

18. The apparatus according to claim 10, wherein the apparatus has means which enable the polycarbonate stream from the polycondensation reactor to be divided into two or more sub-streams, wherein the apparatus has two or more pelleting devices for the purpose of pelleting the two or more sub-streams of the polycarbonate reaction product.

19. The apparatus according to claim 10, wherein a specially selected alkyl aromatic compound is used as the additional heat transfer medium for the temperature control of raw material melts and/or hydroxyl-aryl reaction products, which has good flow properties and good heat transfer capacity in the temperature range of 50-120° C.

20. A polycarbonate produced according to the method of claim 1 or using the apparatus according to claim 10, having:
    a) at least one transesterification reactor for the purpose of receiving a reaction mixture which includes at least one bisphenol and at least one diaryl carbonate, and for the purpose of producing a transesterified intermediate product,
    b) at least one pre-polycondensation reactor for the purpose of producing a pre polycondensation intermediate product from the transesterified intermediate product,
    c) at least one polycondensation reactor (finisher) for the purpose of producing a polycarbonate from the pre-polycondensation intermediate product, wherein at least one transesterification reactor has means for the removal of the hydroxyl-aryl reaction product cleaved during the transesterification reaction, said means having at least one column.

* * * * *